SPAULDING & SCOTT.
Meat Chopper.
No. 2,913. Reissued April 7, 1868.
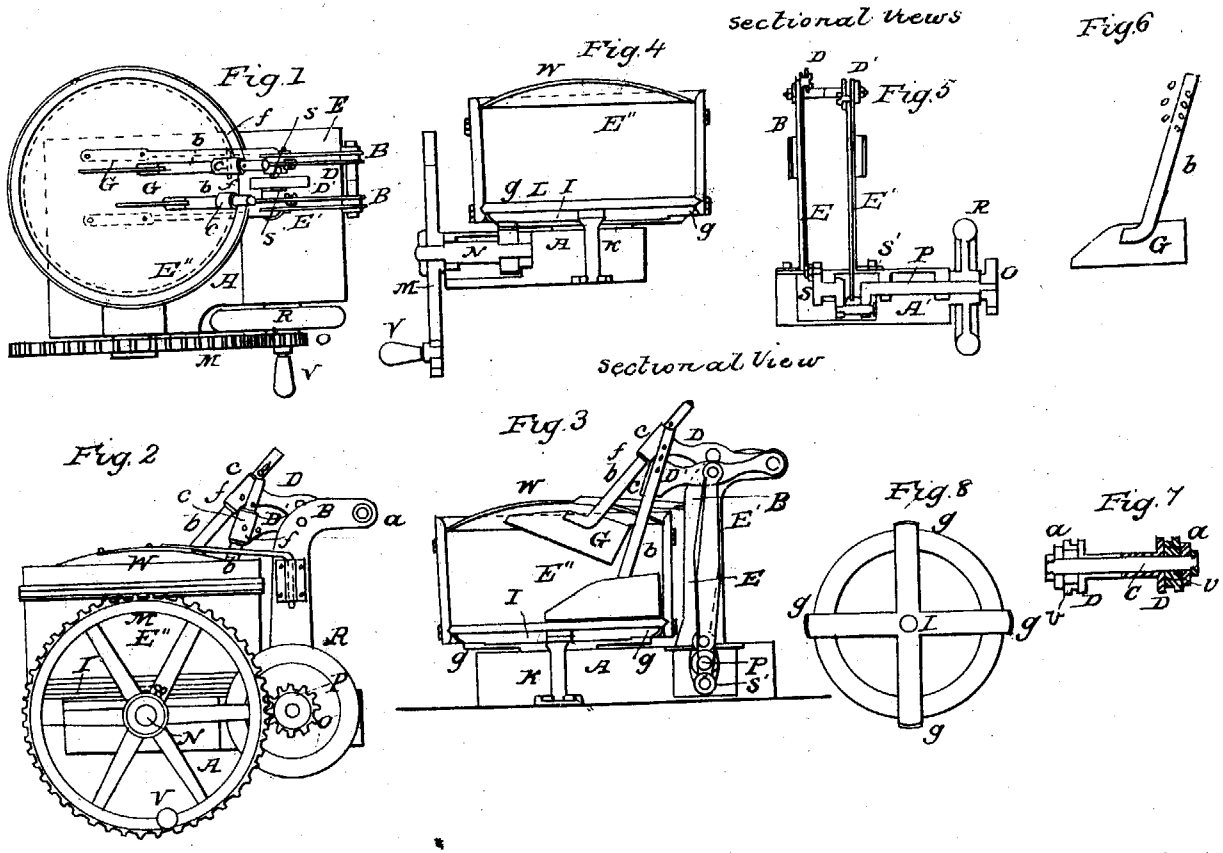
Witnesses
F. P. Hale Jr
H. E. Fisher
Inventors
Alfred F. Spaulding, and Salmon M. Scott.
by their attorney
R. H. Eddy
N. PETERS, Photo-Lithographer, Washington, D. C.

United States Patent Office.

METROPOLITAN WASHING-MACHINE COMPANY, OF MIDDLEFIELD, CONNECTICUT, ASSIGNEES BY MESNE ASSIGNMENTS OF ALFRED F. SPAULDING AND SALMON M. SCOTT.

*Letters Patent No.* 46,153, *dated January* 31, 1865; *reissue No.* 2,913, *dated April* 7, 1868.

IMPROVED MEAT-CHOPPING MACHINE.

The Schedule referred to in these Letters Patent and making part of the same.

TO WHOM IT MAY CONCERN:

Be it known that ALFRED F. SPAULDING and SALMON M. SCOTT, of Winchendon, in the State of Massachusetts, have invented certain new and useful Improvements in Machines for Chopping Meat; and the following is declared to be a full, clear, and exact description of the same, reference being had to the accompanying drawings, in which—

Figure 1 is a top view of the machine with the tub-cover removed.

Figure 2 is a side elevation, and

Figure 3 a longitudinal vertical section of the same.

Figure 4 is a transverse vertical section, taken through the shaft of the driving-wheel.

Figure 5 is a like section of the crank-shaft of the machine.

The improvements which are the subject of this application relate chiefly to the method of and means for operating the cutters or knives of a machine for chopping meat and other substances, and they consist in—

First, the employment, in such a machine, of one or more cutters, and their actuating-mechanism, when so arranged that the substance shall be cut with a "draw cut," or by a drawing stroke of the cutters.

Second, the combination and arrangement of mechanism for producing the necessary vibratory movement of the cutters, and for adjusting said cutters so as to regulate their stroke.

Third, the method of mounting the cutters in the machine, so as to enable them to yield to bones and other obstructions in the tub.

Fourth, the combination, with the tub, of a removable cover.

In order to produce the "draw cut," the vibratory cutters or knives are arranged so that they shall move diagonally, or in a curvilinear path, towards the substance to be chopped, thus avoiding the up-and-down pounding action of the cutters of ordinary machines. The substance is thus minced or cut up much more effectively and thoroughly than can otherwise be accomplished, and the time consumed in the operation is greatly shortened.

To enable those skilled in the art to understand and use the invention, the manner in which the same is or may be carried into effect will now be described.

In the drawings, A denotes the bed-plate of the machine, which may be constructed of wood, cast iron, or any suitable material. To the upper face of the said plate, and near one end thereof, two curved posts or standards, B B, are secured, and extend upward at right angles therefrom, and have the form as shown in figs. 1 and 2. Through holes *a a*, made through the front ends of the said standards, a shaft or rod, C, extends horizontally, and serves as a fulcrum for the two knife-carriers in levers D D, which are so applied thereto as to be capable of having vertical movements imparted to them by means of two connecting-rods, E E, which are respectively hinged or jointed to or near to the middle of the said carriers D D, as seen in figs. 1 and 3. On the rear end of each of the levers D D, a tubular socket, *c*, is made, the same being for the reception of the shanks *b b* of two adjustable knives or cutters, G G, formed as shown in Figure 6, (which is a side view of one of such cutters.) Each of the cutters G should be so formed and applied to its carrier that its cutting-edge, when brought into its lowest position, shall almost touch or be nearly in the same horizontal plane with the top surface of the bottom of the tub E″ in which the knives work. The said knives are made adjustable with respect to the bottom of the tub by means of pins *f f*, which pass through holes made through the sockets *c c*, and a series of holes, *o o*, made through the shanks of the knives, (one series of such holes being shown in fig. 6.) Furthermore, the said knives are so arranged that when in operation their cutting-edges move in a curvilinear path, and thus are caused to act upon the meat or article to be chopped with a drawing stroke.

In order to prevent any injury to the knives or other part of the machine, in case any hard or unyielding material should get between the edge of either knife and the bottom of the tub, a short tubular cylinder, *v*, of India rubber, is placed around each of the journals of the shaft or rod C, in manner as shown in Figure 7, (which is a longitudinal section, taken through the shaft and its bearings.)

The tub E″ is of a cylindrical form, and has a diameter a little less than double the length of the cutting-edge of either of the knives, in order that as the tub is revolved every portion of the material to be chopped shall be brought under the action of the cutters. The said tub is supported upon an annular frame, I, having the form as shown in Figure 8, (which is a top view of such frame.) On the upper surface of the said frame, four or any other suitable number of projections, *g g*, are disposed, and bear against the chines of the tub, and are for the purpose of holding the tub on the frame while the tub may be in revolution. The said frame is formed with or is supported by a vertical spindle or rod, K, which extends down through a slot made through the bed-plate A, and is secured to the latter by a nut screwed upon the lower end of the spindle, as seen in fig. 4. Directly underneath the annular part of the frame I, and so as to work in contact therewith, a rubber friction-wheel, L, is located, the same being affixed to said shaft, as seen in fig. 2. The said gear-wheel M engages with a pinion, *o*, mounted on one end of the secondary driving-shaft P, on which a balance-wheel, R, is arranged, as shown in figs. 1 and 2; the object of this arrangement of the said wheel R being to give a uniform movement to the cutters G G. The said shaft P has formed upon and near its opposite end, two wrists or cranks, S S′, to which the lower ends of the connecting-rods E E′ are respectively united. V is a crank or handle applied to the driving-wheel. By the application of a suitable motor thereto, the machine may be put in operation. W is a removable cover for retaining the meat within the tub while such meat is in the act of being chopped.

By taking hold of the handle V, and turning the driving-wheel or pinion M, rotary motion may be imparted to the driving-wheel shaft, and of course to the friction-driving wheel L, which, in turn, will communicate a continuous rotary movement to the tub H. The said pinion M, at the same time acting on the gear *o*, also gives rotary motion to the shaft P, and as the connecting-rods which are attached to the knife-carriers are jointed to cranks disposed in opposite sides of the said shaft, at angles of one hundred and eighty degrees from each other, reciprocating alternate movements will be imparted to the knives G G, in vertical planes, at each revolution of the said shaft P.

Thus it will be seen that by the above-described peculiar construction and arrangement of the parts of the machine, by simply putting the driving-wheel in revolution, not only a continuous rotary motion is imparted to the tub and the contents thereof, but the knives are given alternate vertical movements in the arcs of circles, whereby the said knives are made to operate to the best advantage (viz, with a drawing stroke) upon the meat or material to be chopped. Furthermore, by giving to the tub a continuous rotary motion, every portion of the material to be chopped will be brought uniformly under the action of the knives.

What is claimed as the invention of the said Alfred F. Spaulding and Salmon M. Scott, is as follows:

1. The employment, in an organized machine for chopping meat, vegetables, and other substances, of a revolving tub, and one or more cutters, and actuating-mechanism, under an arrangement substantially as described, so that the meat or other substance shall be cut with a "draw cut," or by a drawing stroke of the said cutters.

2. The arrangement of the frame, and method of hanging the cutter or cutters in said frame, so that, when operated, the cutters shall travel towards the bottom of the revolving tub in a curvilinear path, substantially as herein described.

3. The combination, with the cutter and its vibratory arm, and mechanism whereby it is made to operate with a drawing-cut, of the means for adjusting the cutter in said arm for the purpose of regulating the stroke of the said cutter, substantially as set forth.

4. The method herein described, or its substantial equivalent, of mounting the vibratory arms of the cutters upon a padded pin, or so that the cutters may yield to intervening obstructions, as herein set forth.

5. The combination, with one or more vibratory cutters, and a tub, of a removable cover overhanging the tub, substantially as herein shown and described.

6. A machine for cutting meat and other substances, composed of the following elements combined: first, a support for the tub, mounted on a central pivot; second, one or more cutters hung in such manner as to produce, when vibrated, a "draw cut;" third, a mechanism to impart vibrating motion to the cutters, and a rotary movement to the tub.

In witness whereof, I, M. W. Terrill, President of the said Metropoliton Washing-Machine Company, acting for and in behalf of the said company, have hereunto set my hand before two subscribing witnesses.

METROPOLITAN WASHING-MACHINE CO.,
M. W. TERRILL, *President.*

Witnesses:
Lyman A. Mills,
E. G. Sherwin.